(12) United States Patent
Beauchesne et al.

(10) Patent No.: US 11,973,768 B2
(45) Date of Patent: Apr. 30, 2024

(54) METHOD AND SYSTEM FOR DETECTING MALICIOUS PAYLOADS

(71) Applicant: Vectra AI, Inc., San Jose, CA (US)

(72) Inventors: Nicolas Beauchesne, Miami Beach, FL (US); John Steven Mancini, San Jose, CA (US)

(73) Assignee: Vectra AI, Inc., San Jose, CA (US)

( * ) Notice: Subject to any disclaimer, the term of this patent is extended or adjusted under 35 U.S.C. 154(b) by 747 days.

(21) Appl. No.: 17/103,882

(22) Filed: Nov. 24, 2020

(65) Prior Publication Data

US 2021/0105290 A1 Apr. 8, 2021

Related U.S. Application Data

(63) Continuation of application No. 15/702,507, filed on Sep. 12, 2017, now abandoned.

(60) Provisional application No. 62/393,596, filed on Sep. 12, 2016.

(51) Int. Cl.
| | |
|---|---|
| G06F 21/56 | (2013.01) |
| G06N 5/022 | (2023.01) |
| H04L 9/40 | (2022.01) |
| H04W 12/12 | (2021.01) |
| G06N 20/00 | (2019.01) |

(52) U.S. Cl.
CPC .......... *H04L 63/1416* (2013.01); *G06F 21/56* (2013.01); *G06N 5/022* (2013.01); *H04W 12/12* (2013.01); *G06N 20/00* (2019.01); *H04L 63/0245* (2013.01); *H04L 63/1425* (2013.01)

(58) Field of Classification Search
CPC .................................................. H04L 63/1416
USPC ............................................................ 706/58
See application file for complete search history.

(56) References Cited

U.S. PATENT DOCUMENTS

| | | | | |
|---|---|---|---|---|
| 7,540,025 | B2 * | 5/2009 | Tzadikario | H04L 63/1425 726/25 |
| 8,205,259 | B2 * | 6/2012 | Stute | C12Q 1/6865 726/23 |
| 8,881,282 | B1 * | 11/2014 | Aziz | G06F 21/554 726/23 |
| 9,094,444 | B2 * | 7/2015 | Baltatu | H04L 43/00 |
| 9,600,656 | B1 * | 3/2017 | Wellinghoff | G06F 21/45 |
| 9,906,542 | B2 | 2/2018 | Boia et al. | |
| 10,055,251 | B1 * | 8/2018 | Cui | G06F 9/461 |
| 10,257,211 | B2 * | 4/2019 | Balabine | G06F 16/951 |
| 11,606,377 | B1 * | 3/2023 | Myers | H04L 63/168 |
| 11,799,882 | B1 * | 10/2023 | Ghosh | G06F 16/215 |
| 2008/0288330 | A1 * | 11/2008 | Hildebrand | G06Q 10/06398 705/7.42 |

(Continued)

FOREIGN PATENT DOCUMENTS

WO    WO 2009084053    7/2009

OTHER PUBLICATIONS

Final Office Action for U.S. Appl. No. 17/103,882 dated Jul. 24, 2020.

(Continued)

*Primary Examiner* — Reza Nabi
(74) *Attorney, Agent, or Firm* — Vista IP Law Group, LLP

(57) ABSTRACT

Disclosed is an improved method, system, and computer program product for identifying malicious payloads. The disclosed approach identifies potentially malicious payload exchanges which may be associated with payload injection or root-kit magic key usage.

20 Claims, 6 Drawing Sheets

(56) References Cited

U.S. PATENT DOCUMENTS

| | | | |
|---|---|---|---|
| 2011/0050461 A1* | 3/2011 | Pixley | G08G 1/056 340/933 |
| 2015/0012751 A1* | 1/2015 | Forster | H04L 63/029 713/171 |
| 2015/0244742 A1* | 8/2015 | Reynolds | H04L 63/205 726/1 |
| 2015/0264069 A1* | 9/2015 | Beauchesne | H04L 63/1416 726/23 |
| 2015/0264083 A1* | 9/2015 | Prenger | G06F 16/285 726/23 |
| 2016/0021141 A1* | 1/2016 | Liu | H04L 63/1483 726/23 |
| 2016/0191551 A1* | 6/2016 | Beauchesne | H04L 63/1425 726/23 |
| 2016/0191563 A1* | 6/2016 | Beauchesne | G06F 21/554 726/25 |
| 2016/0219067 A1* | 7/2016 | Han | H04L 63/1425 |
| 2016/0294856 A1* | 10/2016 | Boia | H04L 63/1425 |
| 2016/0316025 A1* | 10/2016 | Lloyd | H04L 65/1069 |
| 2017/0353477 A1* | 12/2017 | Faigon | G06F 21/554 |
| 2018/0077178 A1* | 3/2018 | Beauchesne | G06N 5/022 |
| 2019/0394220 A1* | 12/2019 | Gupta | G06F 18/24 |
| 2022/0182397 A1* | 6/2022 | Romero Zambrano | H04L 63/1416 |
| 2023/0205891 A1* | 6/2023 | Yellapragada | H04L 63/1433 726/25 |
| 2023/0208870 A1* | 6/2023 | Yellapragada | G06F 21/53 726/22 |

OTHER PUBLICATIONS

Final Office Action for U.S. Appl. No. 17/103,882 dated Aug. 16, 2019.

Non-Final Office Action for U.S. Appl. No. 17/103,882 dated Jan. 13, 2020.

Non-Final Office Action for U.S. Appl. No. 17/103,882 dated Feb. 13, 2019.

Extended European Search Report dated Nov. 7, 2017 for EP Appln. No. 17190452.7.

Jou, Y. Frank, et al. "Design and implementation of a scalable intrusion detection system for the protection of network infrastructure." Proceedings DARPA Information Survivability Conference and Exposition. DISCEX'00. vol. 2. IEEE, 2000.

European Office Action dated Sep. 19, 2019 for EP Appln. No. 17190452.7.

European Office Action dated Jan. 24, 2019 for EP Appln. No. 17190452.7.

European Office Action dated Aug. 13, 2020 for EP Appln. No. 17190452.7.

* cited by examiner

US 11,973,768 B2

METHOD AND SYSTEM FOR DETECTING MALICIOUS PAYLOADS

BACKGROUND

In recent years, it has become increasingly difficult to detect malicious activity carried on networks. The sophistication of intrusions has increased substantially, as entities with greater resources, such as organized crime and state actors, have directed resources towards developing new modes of attacking networks.

For example, in enterprise networks it is critical to restrict user access to servers located inside data centers. One pernicious type of intrusion pertains to the situation when an outside entity attempts to deliver a malicious payload onto a host within an internal network.

With conventional solutions, perimeter security tools such as stateful firewalls are used to define explicit rules about what traffic is allowed to be sent and received from external servers. While these rule-based approaches are able to deter some attackers that send malicious payload that match one of the pre-defined rule conditions, the problem is that these rules can be circumvented merely by using a payload delivery method that does not match any of the existing rules. With the constant evolution of the tools and approaches that are used by attackers, this means that the conventional approaches to implement firewalls are almost certain to include rules that can be circumvented by new approaches used by at least some attackers.

As is evident, there is a great need for approaches that effectively and efficiently identify malicious payloads being delivered to a host on a network.

SUMMARY

Some embodiments provide an improved method, system, and computer program product for identifying malicious payloads. The embodiments of the invention can identify potentially malicious payload exchanges which may be associated with payload injection or rootkit magic key usage. The disclosed invention can expose when a network is undergoing a targeted network attack.

Other additional objects, features, and advantages of the invention are described in the detailed description, figures, and claims.

DETAILED DESCRIPTION

Various embodiments of the methods, systems, and articles of manufacture will now be described in detail with reference to the drawings, which are provided as illustrative examples of the invention so as to enable those skilled in the art to practice the invention. Notably, the figures and the examples below are not meant to limit the scope of the present invention. Where certain elements of the present invention can be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, the present invention encompasses present and future known equivalents to the components referred to herein by way of illustration.

Various embodiments of the invention are directed to a method, system, and computer program product for detecting malicious payloads using unsupervised clustering.

Figure 1A:
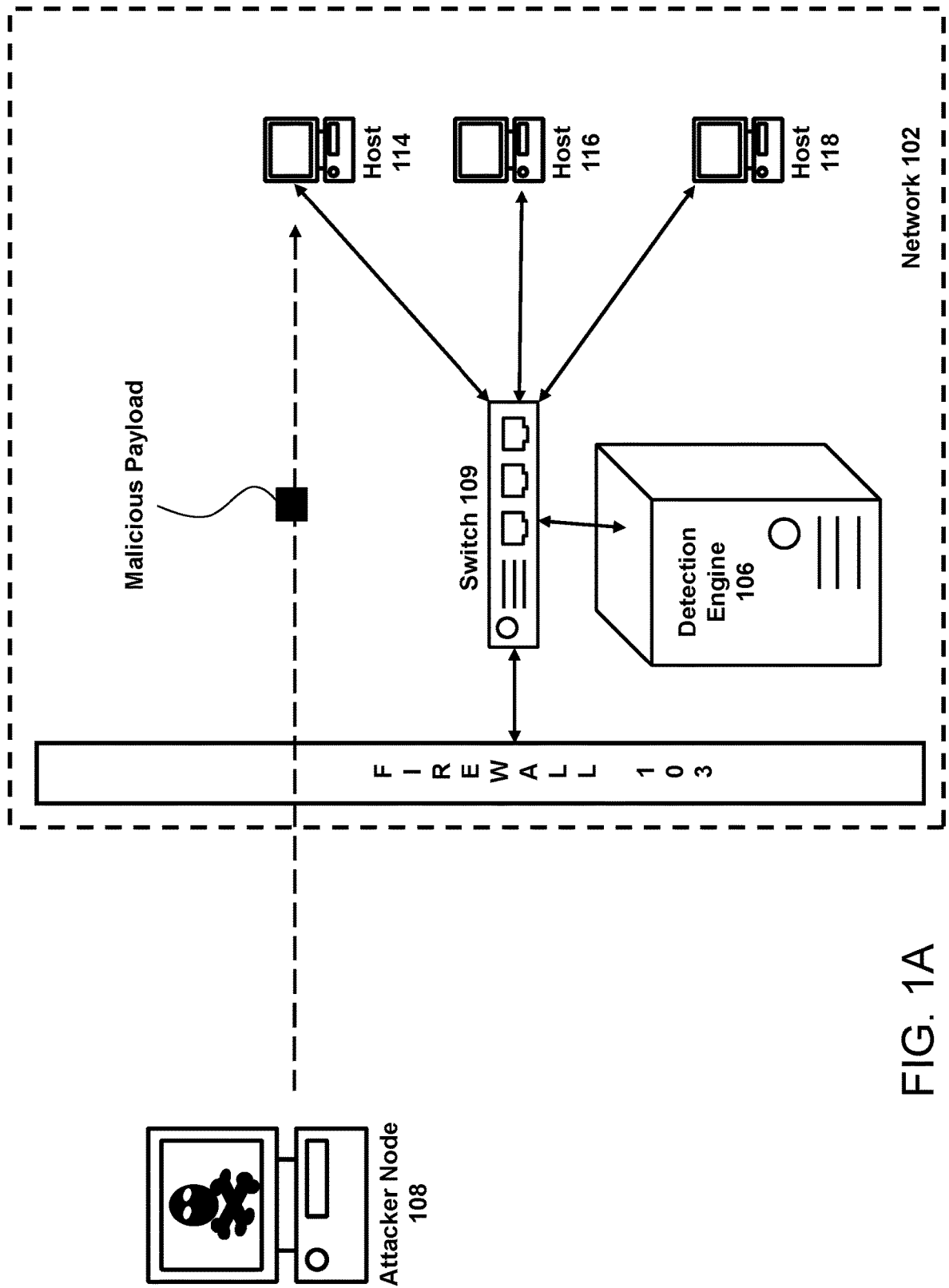
FIG. 1A illustrates an example environment in which a detection engine may be implemented to perform detection of malicious payload as according to some embodiments.

FIG. 1A illustrates an example environment in which a detection engine 106 may be implemented to perform detection of malicious payloads as according to some embodiments. Here, an example network 102 comprises one or more hosts (e.g. assets, clients, computing entities), such as host entities 114, 116, and 118, that may communicate with one another through one or more network devices, such as a network switch 109. The network 102 may communicate with external networks through one or more network border devices as are known in the art, such as a firewall 103. For instance, host 114 may communicate with an external server on node 108 through network protocols such as ICMP, TCP and UDP.

However, it is possible that the external server 108 is an attacker node that seeks to send malicious payloads to the host 114. By way of example, two methods which an attacker may choose to penetrate inside a network through the firewall 103, while undetected, are the direct payload injection approach and the backdoor using kernel rootkit approach.

In the case of direct payload injection, the attacker node 108 sends a uniquely marked payload to targeted machines (such as host 114) and instructs the machine to execute the given code (e.g., which can open a separate connection back to a machine controlled by the attacker). This results in full access to the targeted machine allowing a direct path for exfiltration or subsequent lateral movement. The detection of such payloads is extremely difficult as the payloads can be sent over any open port and appear as connections with no response from the targeted machine.

Another possible approach is for an attacker to create a rootkit back-door for future access to the targeted machine. The back-door will parse all incoming traffic listening for a specific payload corresponding to a "magic key." When the root-kit parses the attacker's payload, the server gives a compliant response and allows the attacker full access to the targeted machine. Just as with the code injection approach, an attacker in the rootkit back-door approach can send its payload to any open port. Attackers can use ports with active services to disguise their actions. The detection of such payloads is extremely difficult as the payloads and appear as connections with near zero-length requests with a benign response or no response from the targeted machine.

These payloads, if left undetected, allow attackers to persist inside a network even when they have been identified and removed from other machines.

As described in more detail below, the detection engine 106 operates by performing unsupervised machine learning using data about the network traffic within the network 102. The detection engine 106 operates to identify malicious payloads used by attackers by considering their anomalous behavior relative to normal traffic over a machine's active ports. In this manner, the disclosed invention provides an approach to identify, in real time, the use of malicious payloads, such as for example, those used in rootkit or code injection attacks inside enterprise networks.

The advantage of this approach is that it does not require a set of pre-defined rules to be configured and constantly updated to identify the presence of malicious payloads. Moreover, since the invention operates by learning the behavior of the network, this means that the detection system is effective even when the attackers are constantly evolving new attack approaches and techniques.

The detection engine 106 may be configured to monitor or tap the network switch 106 to passively analyze the internal network traffic in a way that does not hamper or slow down network traffic (e.g. by creating a copy of the network traffic for analysis). In some embodiments, the detection engine 106 is an external module or physical computer that is coupled to the switch 106. While in some embodiments, the detection engine 106 may be directly integrated as an executable set of instructions into network components, such as the switch 106 or a firewall 103. While still, in some embodiments, the detection engine 106 may be integrated into one or more hosts in a distributed fashion (e.g. each host may have its own set copy of the distributed instructions and the hosts collectively agree to follow or adhere to instructions per protocol to collect and analyze network traffic). In some embodiments, the detection engine 106 can be implemented within one or more virtual machine(s) or containers (e.g., operating system level virtualized-application containers, such as Docker containers and/or LXC containers) sitting on one or more physical hosts. Still in some embodiments, the detection engine 106 may be integrated into a single host that performs monitoring actions for the network 102.

In the illustrated environment, the hosts may connect to one another using different network communication protocols such as ICMP, TCP or UDP. The detection engine 106 may be configured to work as a passive analysis device that can receive, store, and analyze all network traffic sent/received by a single host, or a multitude of hosts. In some embodiments, all network communications may be passed through the switch 106 and the detection engine 106 may tap or span (TAP/SPAN) the switch 106 to access and create a copy of the network communications; for example, by performing a packet capture and saving the network communications in one or more packet capture files. Once received, the network communications may be parsed into flows that correspond to sessions.

Figure 1B:
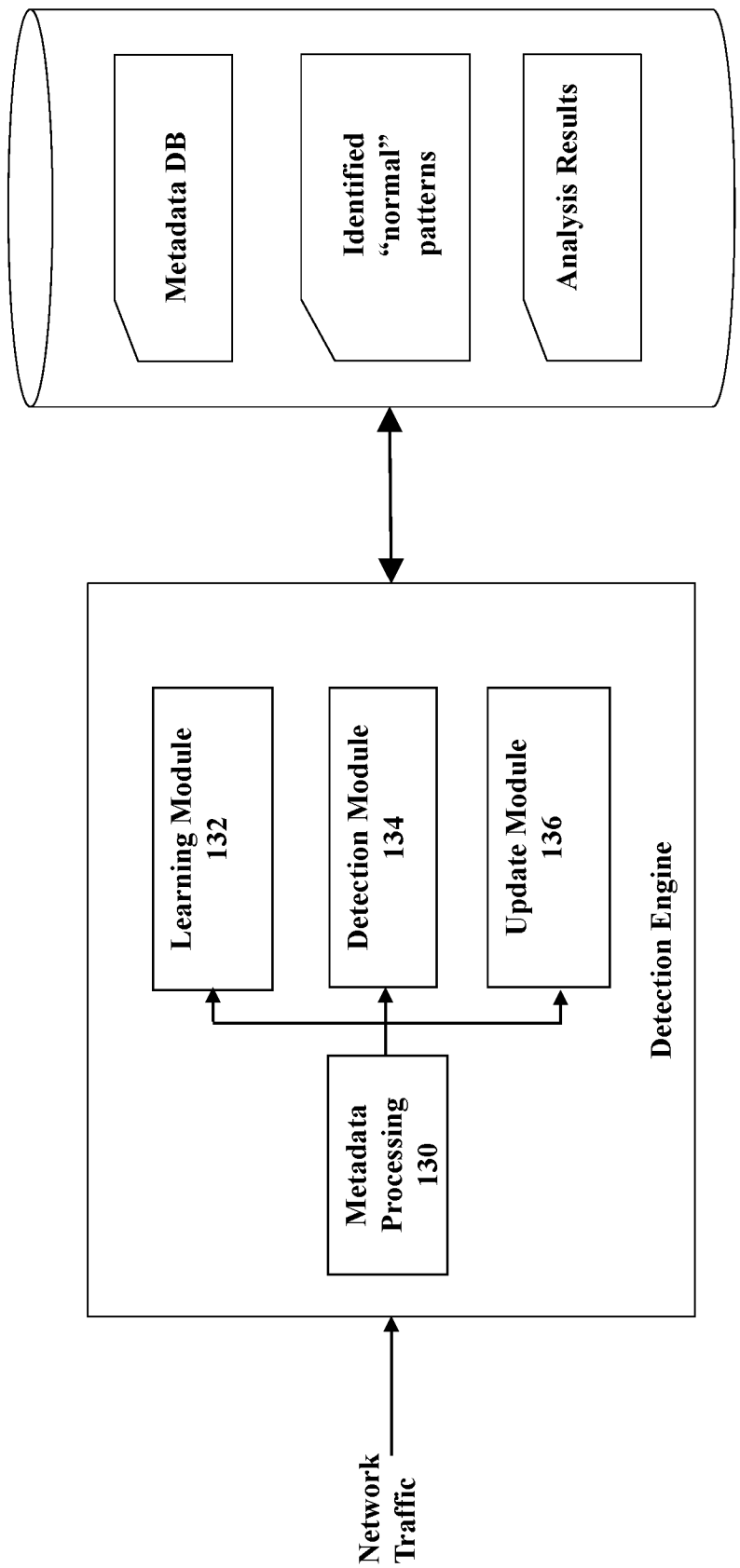
FIG. 1B shows a more detailed view of the detection engine, at which network traffic is examined to learn the behavior of various activities within the network and to detect anomalies from the normal behavior.

FIG. 1B shows a more detailed view of the detection engine, at which network traffic is examined to learn the behavior of various activities within the network and to detect anomalies from the normal behavior. This provides an effective way of determining whether or not communication to a host is hiding a payload injection or rootkit magic key.

In some embodiments, the detection engine performs the following tasks for each machine in the network:
  Perform metadata extraction of the client-server sessions
  Build clusters of representative sequences for the payloads sent from clients and servers following established connection for every active destination port in the network for a defined learning phase.
  Flag client-server sequences which differ significantly from baselined behavior after the learning phase
  Continuously identify new normal client-server sequences after the learning phase At module 130, data from the network traffic is collected, and metadata processing is performed upon that data. In particular, every internal network communication session is processed through a parsing module and a set of metadata is extracted. This collected metadata contains information about the source and destination machines, whether the connection was successfully established, the amount of data transferred, the connection's duration, and the client and server's first payloads following normal connection establishing exchanges.

Therefore, some examples of data to be collected for the network traffic could include:
  Information for clients and servers, such as IP address and host information
  Payloads for both clients and servers
  Amount of data being transferred
  Duration of communications
  Length of time delay between client request and server response At module 132, the metadata derived from the network communications is examined to learn the behavior of the network traffic. In some embodiments, this is accomplished by deriving abstractions of the client-server handshakes following the establishment of a normal connections between clients and servers. These abstractions are then used as vectors for storing baseline behavior models of the clients' activities and the servers' activities. In this way, the learning module creates a uniform and protocol-agnostic model for identifying known and future malicious payloads. Further details regarding an approach to implement the learning process is described below in conjunction with the description of FIG. 2.

At module 134, the system performs detection of suspicious activity with regards to payload deliveries. The metadata for network traffic is analyzed against the models developed by the learning module to identify anomalies from the normal, baseline behavior. The detection analysis may be performed either in real-time or on an asynchronous basis. Further details regarding an approach to perform detection analysis is described below in conjunction with the description of FIG. 3.

At module 136, the system may update the models to reflect updated communications patterns within the network. Further details regarding an approach to perform the updating process is described below in conjunction with the description of FIG. 4.

Any of the data used or created within this system, such as the collected metadata, the baseline behavior models, and/or the analysis results, may be stored within a computer readable storage medium. The computer readable storage medium includes any combination of hardware and/or software that allows for ready access to the data that is located at the computer readable storage medium. For example, the computer readable storage medium could be implemented as computer memory and/or hard drive storage operatively managed by an operating system, and/or remote storage in a networked storage device. The computer readable storage medium could also be implemented as an electronic database system having storage on persistent and/or non-persistent storage.

Figure 2:
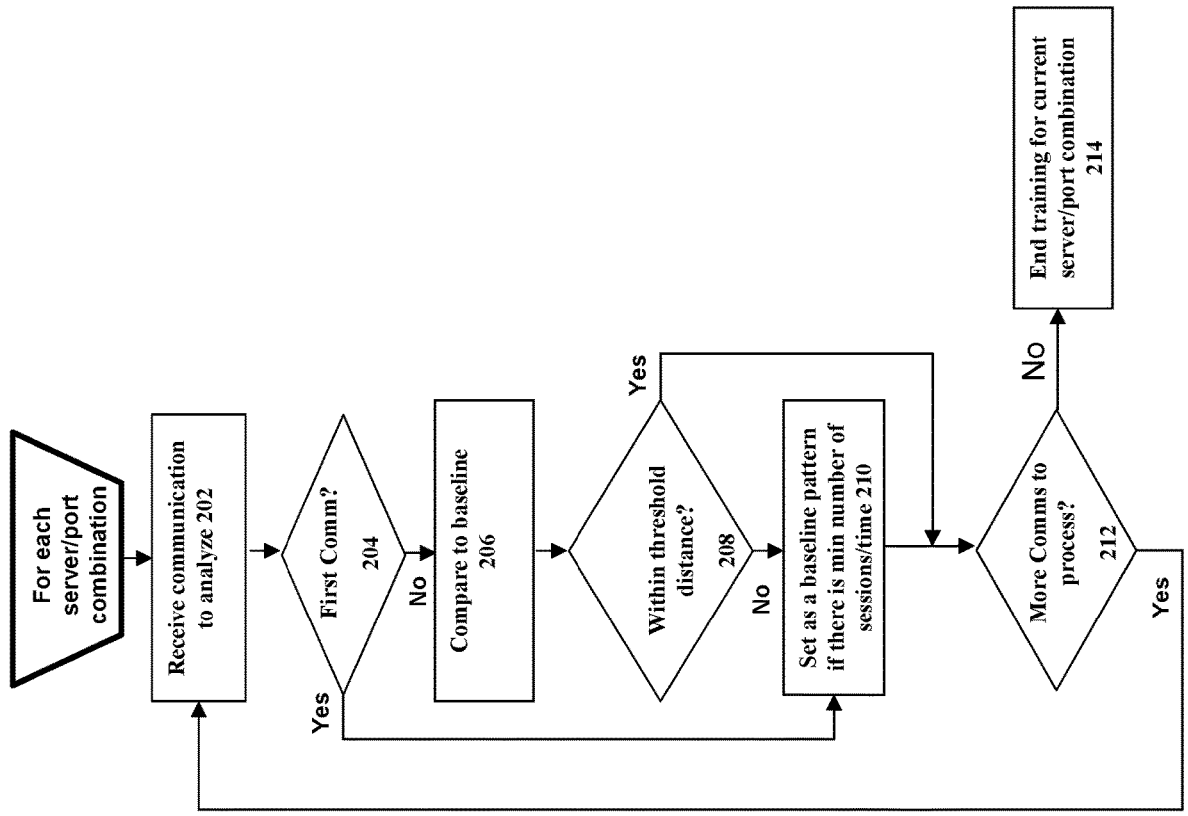
FIG. 2 shows a flowchart of an approach to implement the learning process according to some embodiments of the invention.

FIG. 2 shows a flowchart of an approach to implement the learning process according to some embodiments of the invention. This process is used to identify the normal client and server payloads and representative sequences for each, on all active destination ports.

An unsupervised clustering algorithm is applied to identify representative sequences for a given combination of parameters. For example, in some embodiments, the learning is performed on the basis of each unique combination of a server and port. Therefore, for each server/port combination, the learning process will identify the "normal" payload characteristics, e.g., for a client payload and a server payload. This provides a baseline model of the payload characteristics that can later be used to check whether there are deviations from that normal behavior.

While the current example approach is used to process the data on the basis of the client and server payloads for every unique machine and destination port in the network, it is noted that other combinations may be utilized in alternate embodiments of the invention. For example, the inventive concepts are also applicable to combinations such as client/server/port combinations, client/server combination, client/port combinations, or just ports by themselves.

For each server/port combination, the process at 202 receives the communications to be analyzed. In some embodiments, the analysis is performed on a session basis, e.g., where the analysis is performed on the collection of packets for an entire TCP conversation. It is noted that the inventive concepts may also be applied to other protocols and granularities of network traffic as well.

An abstraction is generated of the client-server handshakes for the session. The client-server handshake is represented as a sequence of bytes, where each sequence corresponds to the beginning bytes of the respective client or server payload. In this way, only the first n bytes of the communications need to be analyzed to classify and analyze the communications. Alternatively, the entirety of the communications may be analyzed.

The normal sequences can then be learned over the course of a specified number of sessions and time duration. During this time, new client or server sequences are added when they differ from previously identified sequences more than a defined similarity score.

At 204, a determination is made whether the sequence under examination is for the first communications to be analyzed. If so, then in some embodiments, this first sequence is stored as the baseline pattern at 210.

The process then returns back to 202 to select the next communications to analyze. For the next communications, since it is not the first communications, the process proceeds to 206 to compare against the one or more baseline patterns.

A similarity score can be calculated to perform the comparison. In some embodiments, the similarity score is calculated using a Hamming distance between two sequences with a bias towards sequential equivalences.

If the similarity is not within a threshold distance, then the new sequence is assumed not to cluster with the previously identified baseline pattern(s). Therefore, at 210, the sequence is stored as a new baseline pattern. In some embodiments, in order to ensure that a converged normal state is reached, a minimum number of sessions and time must pass without identifying sequences as new baseline patterns.

If the similarity is within the threshold distance, then the new sequence is assumed to cluster with the previously identified baseline pattern(s). Therefore, no new baseline is added for this situation. Instead, the process will move to 212 to check whether there are more communications to process.

If there are further communications to analyze, then the process returns back to 202 to receive the next communications. If there are no further communications to analyze, then the process ends the learning phase at 214.

Figure 3:
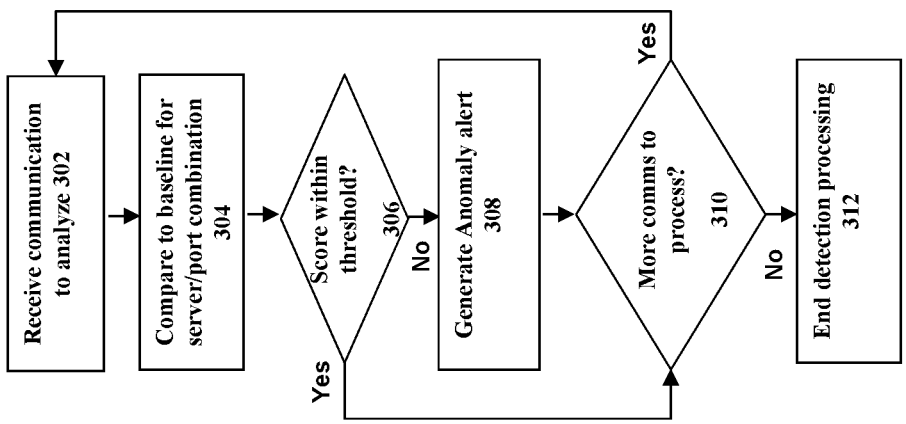
FIG. 3 shows a flowchart of an approach to implement the detection process according to some embodiments of the invention.

FIG. 3 shows a flowchart of an approach to implement the detection process according to some embodiments of the invention. This process is used to flag client-server payload representations which differ significantly from the baselined behavior(s).

At 302, the communications to be analyzed are received. As previously noted, the analysis is performed on a session basis. A sequence of bytes for the payload is extracted for the detection analysis process.

At 304, a comparison is made between the extracted sequence of the current communications and the patterns that have been saved for the baseline behaviors. In particular, the client and server payloads in all sessions following the learning period are scored relative to the learned normal behavior. As before, a Hamming distance can be used to calculate the score.

A determination is made at 306 whether the calculated score is within a defined threshold. If the pair of client-server sequences differ more than the specified similarity score, then the session containing the exchange is flagged as a potentially malicious payload at 308.

If there are further communications to analyze (310), then the process returns back to 302 to receive the next communications. If there are no further communications to analyze, then the process ends the detection phase.

Figure 4:
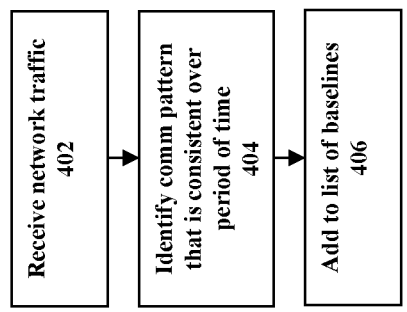
FIG. 4 shows a flowchart of an approach to implement an updating process according to some embodiments of the invention.

FIG. 4 shows a flowchart of an approach to implement an updating process according to some embodiments of the invention. This process is used to identify new normal client and server payloads. It is noted that this process is employed since new client and server payloads can be learned by the system even after the learning period.

At 402, the communications to analyze are received. As previously noted, the analysis is performed on a session basis for server/port combinations. A sequence of bytes for the payload is extracted for the detection analysis process.

At 404, over a given period of time, a determination is made whether there is a new sequence having a score that is below the similarity threshold that is consistent over that period of time.

At 406, if only one of the client or server sequences is scored below the similarity threshold but the other is above, the new sequence is added as normal behavior. If pairs of client-server sequences are flagged more than a specified number of times as malicious, they are learned as normal behavior for the specific port.

Therefore, what has been described is an improved method, system, and computer program product for identifying malicious payloads. The disclosed invention can identify potentially malicious payload exchanges which may be associated with payload injection or root-kit magic key usage. The disclosed invention can expose when a network is undergoing a targeted network attack.

System Architecture Overview

Figure 5:
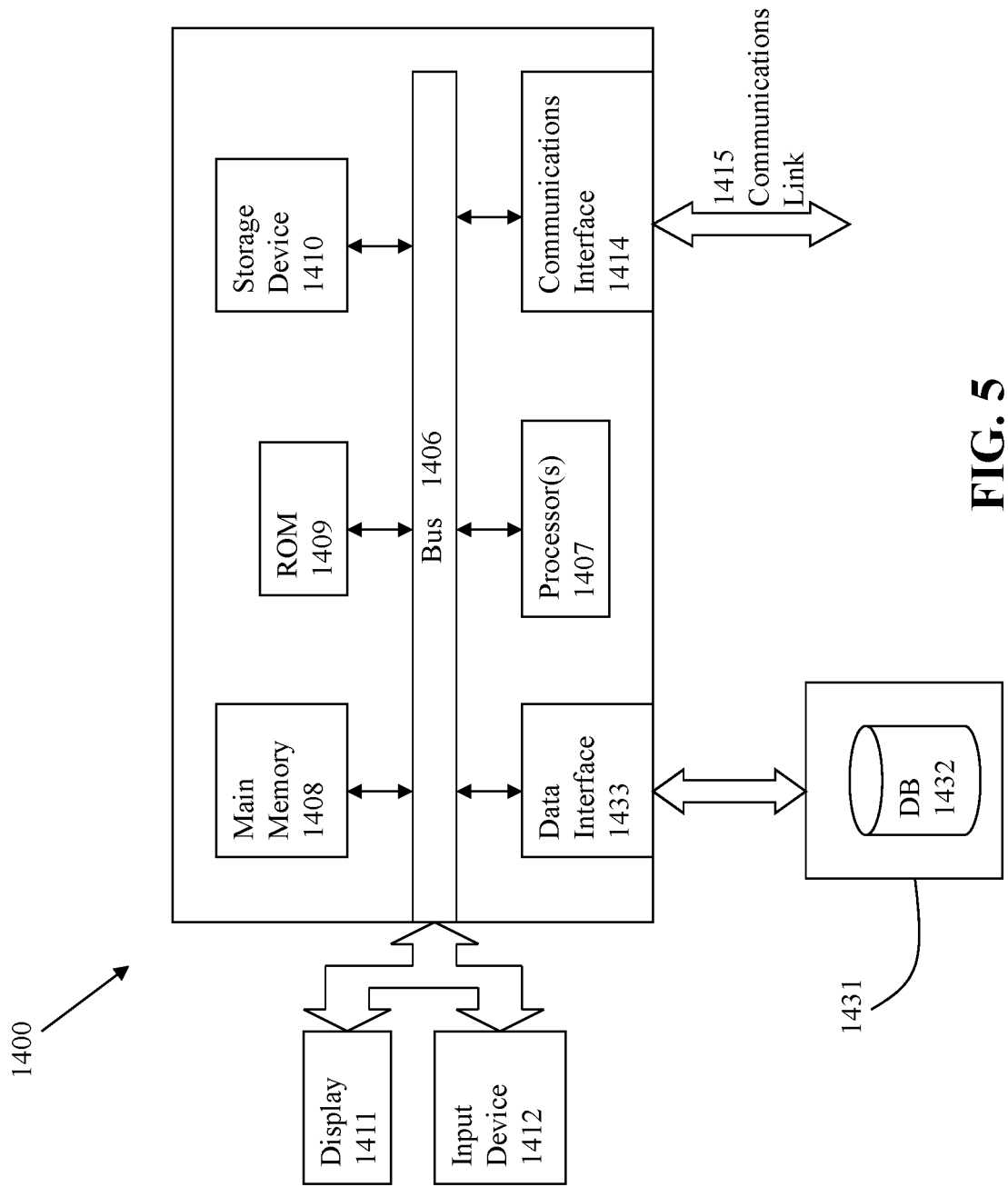
FIG. 5 is a block diagram of an illustrative computing system 1400 suitable for implementing an embodiment of the present invention for performing intrusion detection

FIG. 5 is a block diagram of an illustrative computing system 1400 suitable for implementing an embodiment of the present invention for performing intrusion detection. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control. A database 1432 may be accessed in a storage medium using a data interface 1433.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A system for implementing machine learning using communications over respective unique server and port combinations within a network environment, the system comprising:
 a metadata processing element that extracts metadata from network traffic for client-server sessions;
 a learning module generating and storing a plurality of behavior models for respective unique combinations of a server and a port from the client-server sessions, a respective behavior model of the plurality of behavior models being generated during a training period by:
  storing a first baseline pattern for a first communication of a respective unique combination in the respective behavior model corresponding to the respective unique combination,
  comparing one or more additional baseline patterns for one or more additional communications to any existing baseline patterns for the respective unique combination to generate a similarity score, and
  storing respective additional baseline patterns for the one or more additional communications of a respective unique combination in the respective behavior model corresponding to the respective unique combination based on the similarity score; and
 an update module updating the plurality of behavior models for the respective unique combinations of the server and the port from the client-server sessions, the respective behavior model of the plurality of behavior models being updated outside of the training period by:
  comparing one or more new baseline patterns for one or more new communications to any existing baseline patterns for the respective unique combination to generate a similarity score, and
  storing respective new baseline patterns for the one or more new communications of a respective unique combination in the respective behavior model corresponding to the respective unique combination based on the similarity score and a threshold number of occurrences, wherein the similarity score is calculated using a hamming distance between two baseline patterns.

2. The system of claim 1, wherein if the similarity score is within a threshold distance a respective new baseline pattern is not stored.

3. The system of claim 1, wherein the hamming distance is bias towards sequential equivalence.

4. The system of claim 1, wherein the metadata extracted from the network traffic comprises some or more of IP address information for clients and servers, payload information, quantity information for transferred data, duration of communications, or length of time delay between client requests and server responses.

5. The system of claim 1, wherein a baseline pattern comprises at least a sequential portion of a corresponding payload from a corresponding communication, the sequential portion comprising a subset of the corresponding payload.

6. The system of claim 1, further comprising a detection module, the detection module detecting communications for a subsequent client-server session that are within a distance threshold from a behavior model for a matching unique combination of a particular server and a particular port for the client-server session, by:
 comparing one or more subsequent baseline patterns of one or more subsequent communications for the subsequent client-server session to any existing baseline patterns in the behavior model for the respective unique combination to determine if a distance between the subsequent client-server session and a previous client-server session represented by the behavior model for a matching unique combination for the client-server session is within the distance threshold, and
generating an alert for the client-server session when the client-server session is outside of the distance.

7. The system of claim 6, wherein the alert flags the client-server session as a potentially malicious.

8. A non-transitory computer readable medium having stored thereon a sequence of instructions which, when executed by a computing device having a processor and a memory performs a set of acts for implementing machine learning using communications over respective unique server and port combinations within a network environment, the set of acts comprising:
extracting metadata from network traffic for client-server sessions using a metadata processing element;
generating and storing, using a learning module, a plurality of behavior models for respective unique combinations of a server and a port from the client-server sessions, a respective behavior model of the plurality of behavior models being generated during a training period by:
storing a first baseline pattern for a first communication of a respective unique combination in the respective behavior model corresponding to the respective unique combination,
comparing one or more additional baseline patterns for one or more additional communications to any existing baseline patterns for the respective unique combination to generate a similarity score, and
storing respective additional baseline patterns for the one or more additional communications of a respective unique combination in the respective behavior model corresponding to the respective unique combination based on the similarity score; and
updating, using an update module, the plurality of behavior models for the respective unique combinations of the server and the port from the client-server sessions, the respective behavior model of the plurality of behavior models being updated outside of the training period by:
comparing one or more new baseline patterns for one or more new communications to any existing baseline patterns for the respective unique combination to generate a similarity score, and
storing respective new baseline patterns for the one or more new communications of a respective unique combination in the respective behavior model corresponding to the respective unique combination based on the similarity score and a threshold number of occurrences, wherein the similarity score is calculated using a hamming distance between two baseline patterns.

9. The non-transitory computer readable medium of claim 8, wherein if the similarity score is within a threshold distance a respective new baseline pattern is not stored.

10. The non-transitory computer readable medium of claim 8, wherein the hamming distance is bias towards sequential equivalence.

11. The non-transitory computer readable medium of claim 8, wherein the metadata extracted from the network traffic comprises some or more of IP address information for clients and servers, payload information, quantity information for transferred data, duration of communications, or length of time delay between client requests and server responses.

12. The non-transitory computer readable medium of claim 8, wherein a baseline pattern comprises at least a sequential portion of a corresponding payload from a corresponding communication, the sequential portion comprising a subset of the corresponding payload.

13. The non-transitory computer readable medium of claim 8, wherein the set of acts further comprise detecting, using a detection module, communications for a subsequent client-server session that are within a distance threshold from a behavior model for a matching unique combination of a particular server and a particular port for the client-server session, by:
comparing one or more subsequent baseline patterns of one or more subsequent communications for the subsequent client-server session to any existing baseline patterns in the behavior model for the respective unique combination to determine if a distance between the subsequent client-server session and a previous client-server session represented by the behavior model for a matching unique combination for the client-server session is within the distance threshold, and
generating an alert for the client-server session when the client-server session is outside of the distance.

14. The non-transitory computer readable medium of claim 13, wherein the alert flags the client-server session as a potentially malicious.

15. A method for implementing machine learning using communications over respective unique server and port combinations within a network environment, the method comprising:
extracting metadata from network traffic for client-server sessions using a metadata processing element;
generating and storing, using a learning module, a plurality of behavior models for respective unique combinations of a server and a port from the client-server sessions, a respective behavior model of the plurality of behavior models being generated during a training period by:
storing a first baseline pattern for a first communication of a respective unique combination in the respective behavior model corresponding to the respective unique combination,
comparing one or more additional baseline patterns for one or more additional communications to any existing baseline patterns for the respective unique combination to generate a similarity score, and
storing respective additional baseline patterns for the one or more additional communications of a respective unique combination in the respective behavior model corresponding to the respective unique combination based on the similarity score; and
updating, using an update module, the plurality of behavior models for the respective unique combinations of the server and the port from the client-server sessions, the respective behavior model of the plurality of behavior models being updated outside of the training period by:
comparing one or more new baseline patterns for one or more new communications to any existing baseline patterns for the respective unique combination to generate a similarity score, and storing respective new baseline patterns for the one or more new communications of a respective unique combination in the respective behavior model corresponding to the respective unique combination based on the similarity score and a threshold number of occurrences, wherein the similarity score is calculated using a hamming distance between two baseline patterns.

16. The method of claim 15, wherein if the similarity score is within a threshold distance a respective new baseline pattern is not stored.

17. The method of claim 15, wherein the hamming distance is bias towards sequential equivalence.

18. The method of claim 15, wherein the metadata extracted from the network traffic comprises some or more of IP address information for clients and servers, payload information, quantity information for transferred data, duration of communications, or length of time delay between client requests and server responses.

19. The method of claim 15, wherein a baseline pattern comprises at least a sequential portion of a corresponding payload from a corresponding communication, the sequential portion comprising a subset of the corresponding payload.

20. The method of claim 15, further comprising detecting, using a detection module, communications for a subsequent client-server session that are within a distance threshold from a behavior model for a matching unique combination of a particular server and a particular port for the client-server session, by:
  comparing one or more subsequent baseline patterns of one or more subsequent communications for the subsequent client-server session to any existing baseline patterns in the behavior model for the respective unique combination to determine if a distance between the subsequent client-server session and a previous client-server session represented by the behavior model for a matching unique combination for the client-server session is within the distance threshold, and
  generating an alert for the client-server session when the client-server session is outside of the distance.

* * * * *